United States Patent [19]

Celiano

[11] Patent Number: 4,853,984
[45] Date of Patent: Aug. 8, 1989

[54] SYSTEM AND METHOD FOR MAINTAINING A SWIMMING POOL COVER DRAINED OF ACCUMULATED PRECIPITATION

[76] Inventor: Eugene Celiano, 2623 River Rd., Manasquan, N.J. 08736

[21] Appl. No.: 18,707

[22] Filed: Feb. 25, 1987

[51] Int. Cl.⁴ .................................... E04H 3/18
[52] U.S. Cl. ................................. 4/496; 4/498; 4/508; 4/509; 137/132; 137/386; 137/392
[58] Field of Search ............... 4/498, 496, 508, 501, 4/507, 509; 137/386, 132, 392

[56] References Cited

U.S. PATENT DOCUMENTS

| | | | |
|---|---|---|---|
| 2,810,350 | 10/1957 | MacWilliams | 417/12 X |
| 3,184,764 | 5/1965 | West | 4/498 |
| 3,377,632 | 4/1968 | Peterson | 4/490 |
| 3,579,657 | 7/1971 | Gurrieri | 4/490 |
| 4,318,421 | 5/1982 | Ward | 4/498 X |
| 4,361,522 | 11/1982 | Goettl | 137/132 X |
| 4,380,091 | 4/1983 | Lively | 4/508 |
| 4,406,300 | 9/1983 | Wilson | 137/132 |
| 4,421,643 | 12/1983 | Frederick | 210/138 |
| 4,445,238 | 5/1984 | Maxhimer | 4/508 |
| 4,505,643 | 3/1985 | Millis et al. | 417/12 |
| 4,541,446 | 9/1985 | Hogan | 137/392 |
| 4,551,068 | 11/1985 | Boudreaux | 137/392 X |

Primary Examiner—Henry J. Recla
Assistant Examiner—Linda J. Sholl
Attorney, Agent, or Firm—Kenyon & Kenyon

[57] ABSTRACT

In a drainage system for maintaining a swimming pool cover drained of accumulated precipitation, a pump with its intake is disposed in a fluid trap defined by an upper surface of the swimming pool cover. A discharge port of the pump is disposed outside of the fluid trap. A sensor is disposed in a flow path of the pump for detecting the presence of fluid flow therethrough, while a clock unit is operatively connected to the pump for periodically operating the pump for a ten-second interval. A control circuit continues to operate the pump beyond the ten-second interval upon the detection by the sensor of fluid flow through the pump at the end of the ten-second interval. In that case, operation of the pump is terminated only upon a cease of fluid flow through the pump.

18 Claims, 1 Drawing Sheet

SYSTEM AND METHOD FOR MAINTAINING A SWIMMING POOL COVER DRAINED OF ACCUMULATED PRECIPITATION

BACKGROUND OF THE INVENTION

This invention relates to a system and to a method for maintaining a swimming pool cover drained of accumulated precipitation.

In temperate climates swimming pools are generally covered during the winter season with a synthetic resin (e.g., vinyl) cover to maintain the cleanliness of the water and to thereby minimize the need for repainting the pool walls and bottoms. So maintaining the cleanliness of the water also obviates the necessity of cleaning the water with heavy doses of chemicals at the beginning of each swimming season. An additional cover, exemplarily the form of a stretch mesh, is sometimes used to prevent leaves and other airborne materials from settling on top the plastic pool cover.

Water which collects on any type of solid pool cover from rainfall and snowfall is pumped off conventionally by a small pump resting on top of the plastic cover. This procedure is recommended by various cover manufacturers and pool supply vendors. Generally, such a pump is connected to an electrical power supply by a user upon the accumulation of a predetermined amount of water on the pool cover, water in excess of this predetermined amount being considered hazardous to the integrity of the cover. Such a procedure is obviously time consuming and tedious.

One possible method for automatically draining accumulated precipitation from a fluid trap in a swimming pool cover comprises the use of a float assembl. Such a method, however, is unsatisfactory owing to the instability of the pool cover as it lies on top of the water and further owing to the "sinking in" of items located on the cover.

Another technique for automatically draining a swimming pool cover includes the use of an electronic water sensing device to control operation of a pump. Such a device is also susceptible to the "sinking in" problem and to the fact that a pump is generally unable to drain a reservoir completely. Accordingly, the electronic water sensing device could be disposed in a small area of water on the swimming pool cover and would continue to operate the pump even though the fluid inlet of the pump was not in communication with the small area of water in which the sensing device was located.

U.S. Pat. No. 4,505,643 to Millis et al. discloses a system for pumping water between a swimming pool or other reservoir and a filter. The control circuit for the pump includes an intermittent actuator for intermittently producing a pump signal with a selectable first duration, e.g., thirty minutes and a selectable first periodicity, e.g., twenty-four hours. A low or abnormal pressure shutdown device terminates operation of the circulating pump unless a circulation fluid pressure attains a preselected pressure level within a preselected second time duration, preferably two minutes. Accordingly, a circulating pump system in accordance with the disclosure of U.S. Pat. No. 4,505,643, Millis et al. operates for the entire first duration unless a low pressure condition is detected during the second, shorter, interval.

U.S. Pat. No. 4,318,421 to Ward is directed to a float control syphon valve for a swimming pool cover. The valve includes cooperating male and female valve members, one of which members is coupled to a float body effectuating the alternate engagement and disengagement of the valve members in response to the level of water accumulated in the swimming pool cover. Such a control syphon valve is not practical insofar as it will operate effectively only if there is a large quantity of water on the pool cover and the drainage point is lower than the level of the cover.

U.S. Pat. No. 3,579,657 to Gurrieri discloses a device for pumping water from a swimming pool cover. The pumping device includes a first unit located on a swimming pool cover, the first unit having a float valve opened by water which has accumulated on the cover. A second unit is provided at a pool skimmer and is connected to the float valve so that water from the cover is conducted to an inlet of a pump in the pool's circulation system. A disadvantage of the device disclosed in U.S. Pat. No. 3,579,657, Gurrieri is that it is inapplicable in most cases due to a removal of the pool's circulation pump and the replacement of water in the interconnecting lines with antifreeze during the winter months. Moreover, closed pools generally do not have skimmers in operation. The method of U.S. Pat. No. 3,579,657, Gurrieri is evidently costly and prone to suction loss and clogging by leaves.

U.S. Pat. No. 3,184,764 to West is directed to a swimming pool cover provided in a central region with a screen overlying a drain opening. Such a drainage system is not adaptable to pre-existing pool covers.

U.S. Pat. No. 2,810,350 to MacWilliams is directed to a method for priming a pump and discloses an automatic pumping system having a gravity operated check valve in a discharge pipe, which check valve is closed by water pressure in the discharge pipe when there is no flow. Upon the cessation of water flow, the check valve operates a check valve switch to shut down the pump.

The object of the present invention is to provide an improved system and an improved method for maintaining a swimming pool cover drained of accumulated precipitation.

Another, more particular, object of the present invention is to provide such a method and such a system which operate automatically, without the need for human intervention.

Another particular object of the present invention is to provide such a method and such a system which conserves energy and extends the useful lifetime of the operating parts.

SUMMARY OF THE INVENTION

A method for maintaining a swimming pool cover drained of accumulated precipitation comprises, in accordance with the present invention, the steps of (a) disposing an intake of a pump in a fluid trap defined by an upper surface of a swimming pool cover, (b) disposing a discharge port of the pump outside an area covered by the swimming pool cover, (c) periodically operating the pump for a predetermined time interval, (d) monitoring a flow path of the pump to detect the presence of fluid flow through the pump and (e) upon detecting, at the termination of the predetermined time interval, fluid flow through the pump, continuing to operate the pump until the flow of fluid along the flow path ceases. Accordingly, if no fluid is flowing through the pump at the end of the predetermined time interval, the operation of the pump is terminated at that juncture. If fluid is flowing through the pump at the end of the predetermined time interval, the pump continues to operate until the fluid flow ceases. Preferably, the predetermined time interval is no more than 15 seconds in duration.

A concomitant system for maintaining a swimming pool cover drained of accumulated precipitation comprises, in accordance with the present invention, a pump having an intake disposable in a fluid trap defined by an upper surface of the swimming pool cover. The pump has a discharge port positionable outside of the fluid trap, while a sensor is disposed in a flow path of the pump for detecting the presence of fluid flow through the pump. The system further comprises a controller, including a time clock unit operatively connected to the pump. The controller periodically operates the pump for a predetermined time interval and is operatively connected to the sensor for continuing to operate the pump beyond the predetermined interval upon detecting, at the end of that interval, fluid flow through the pump, and for subsequently terminating operation of the pump only upon a cease of fluid flow through the pump.

Pursuant to particular features of the present invention, the sensor includes a flow switch, while the controller further includes a bypass timer connected at a first terminal to the clock and at a second terminal to a normally open contact of the flow switch.

Pursuant to yet further particular features of the present invention, the pump is provided with a discharge line in the form of a polyethylene tube, the discharge port of the pump being located at a free end of the tube. The flow switch is preferably disposed at least in part in the polyethylene tube.

A system in accordance with the present invention is specifically designed for automatically pumping fluid, i.e., water, from a reservoir in which the water accumulates at irregular intervals and in unpredictable amounts. The pump is automatically energized at recurrent intervals, e.g., every eight hours, for a predetermined period, e.g., ten seconds, to determine whether any liquid has accumulated in the reservoir. If liquid has accumulated, pumping continues until the liquid has been substantially drained.

A system in accordance with the present invention has been in experimental operation in a private pool for three years and has been found to consume a minimum amount of energy and to operate for a minimum amount of time, thereby preserving the operating parts of the system.

DETAILED DESCRIPTION

Figure 1:
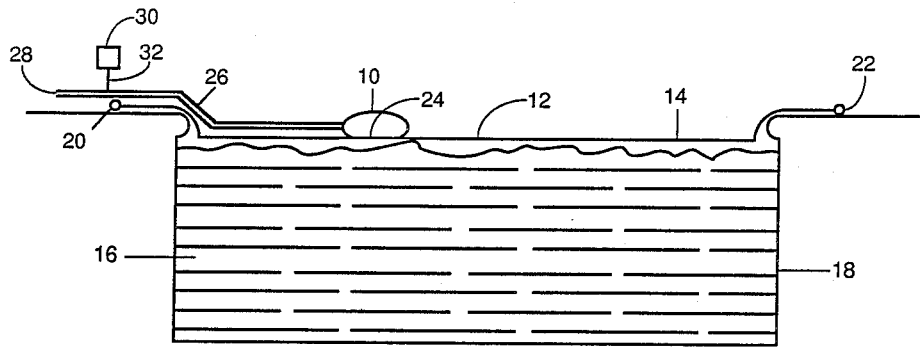
FIG. 1 is a diagram of a swimming pool and an associated pool cover in which an automatic drainage system in accordance with the present invention has been installed.

As illustrated in FIG. 1, a pump 10 is disposed in a reservoir region or fluid trap 12 defined by an upper surface of a swimming pool cover 14. Cover 14 rests on the upper surface of a volume of water 16 contained in a swimming pool 18. Swimming pool cover 14 is anchored by conventional and various methods at the sides of the pool, as indicated at 20 and 22.

Pump 10 has an inlet port or fluid intake 24 communicating with fluid trap 12. Connected to an outlet of pump 10 is a discharge line in the form of a polyethylene tube 26 having an outflow port 28 located at a drain outside of the area of pool cover 14. A flow switch 30 has a sensing member 32 such as a paddle at least partially disposed inside polyethylene tube 26 for sensing a flow of water therethrough.

Figure 2:
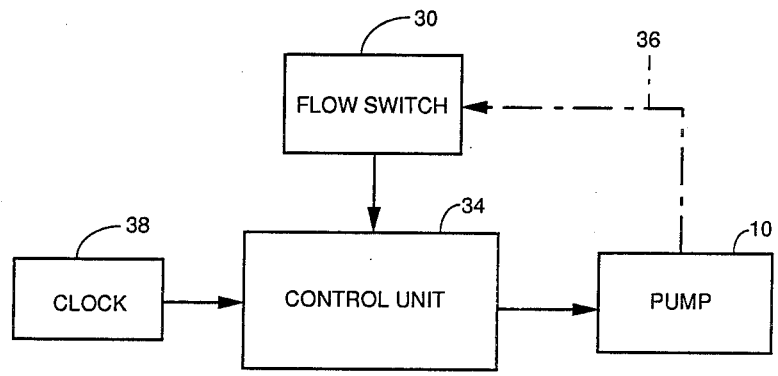
FIG. 2 is a block diagram showing operative elements of the drainage system illustrated in FIG. 1.

As schematically illustrated in FIG. 2, flow switch 30, particularly sensor member 32 thereof, may be connected at an output to a control unit 34 for delivering thereto a signal indicating whether water is flowing through polyethylene tube 26, the sensing function of flow switch 30 being represented in FIG. 2 by a dot-dash line 36. A clock 38 is connected at an output to control unit 34 for delivering thereto at periodic intervals a start signal for inducting pump 10 to commence a pumping operation. Upon the delivery of the start signal, pump 10 is controlled by unit 34 to continue operating for a ten-second interval. If at the termination of the ten-second interval flow switch 30 fails to detect fluid flow through pump 10, control unit 34 de-energizes the pump. If, on the contrary, fluid flow through pump 10 is detected by flow switch 30 at the end of the ten-second interval, control unit 34 continues to energize pump 10 until the flow of fluid along a flow path through the pump ceases. Accordingly, after the end of the 10-second interval, the operation of the pump is terminated only upon the detection of an absence of fluid flow through the pump.

To implement these steps, control unit 34 may include a logic circuit (not illustrated) transmitting a pumping signal to pump 10 if and only if the control unit receives at least one line voltage signal from flow switch 30 and clock 38. Clearly, once pump 10 has been de-energized and water has ceased to flow, switch 30 will not deliver a flow detection signal to control unit 34 until clock 38 initiates another ten-second pumping interval.

Figure 3:
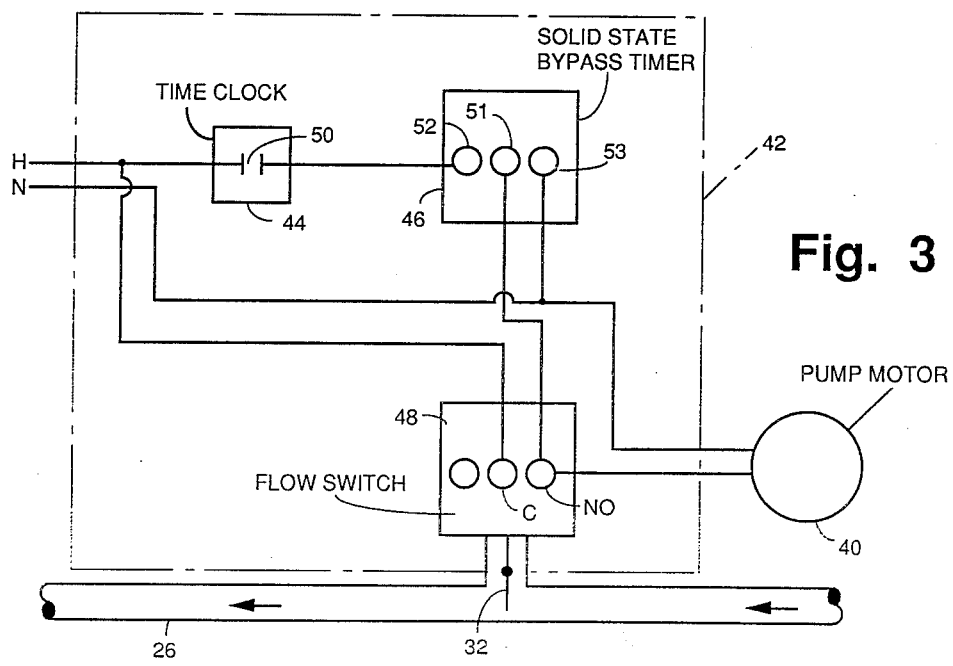
FIG. 3 is a diagram of a control circuit for the system of FIG. 1.

In a preferred embodiment of the invention illustrated in part in FIG. 3, a motor 40 of pump 10 is operated by a control unit 42 including a time clock 44, a bypass timer 46 and an electrical circuit component 48 of a flow switch. The hot leg H of a 115 volt, 60 cycle power line is connected to an input of time clock 44 and to a common input C of flow switch circuit component 48. An output led of time clock 44 extends to a first terminal 52 of bypass timer 46, while a second terminal 51 of that timer is connected to a normally open terminal NO of flow switch circuit component 48. The normally open contact or terminal NO is also directly connected to the pump motor 40. A third terminal 53 of bypass timer 46 and one leg of pump motor 40 are both connected to the neutral leg N of the 115 volt, 60 cycle power supply line.

Bypass timer 46 may exemplarily take the form of a Mars solid state bypass timer, Model No. 32395.

Upon the closing of a switch or contact 50 in time clock 44, terminal 52 of bypass timer 46 is connected to terminal 51 for a ten-second interval. Current then flows from the hot leg H of the power supply line through time clock 44, terminals 52 and 51 of timer 46, the normally open terminal NO of flow switch circuit component 48 and finally to pump motor 40. If within the ten-second interval a sensor member of the flow switch detects fluid flow through polyethylene tube 26 of the drainage system, common terminal C is connected to normally open terminal NO, whereby current flows from hot leg H of the power supply line through terminals C and N to pump motor 40. Current continues to flow along that path through the flow switch circuit component 48 and pump motor 40 as long as water flows through polyethylene tube 26. Upon the termination of that flow, contact between common terminal C and normally open terminal NO is broken. That contact cannot be re-established until time clock 44 has initiated another ten-second pumping interval through contacts 52 and 51 of bypass timer 46.

Although the invention as been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A system for maintaining a swimming pool cover drained of accumulated precipitation, said system comprising:
   a pump having an intake disposable in a fluid trap defined by an upper surface of the swimming pool cover, said pump having a discharge port disposable outside of said trap for pumping fluid from the trap to a location outside of the pool to drain the fluid from the trap;
   a fluid flow switch having a sensor member disposed in a flow path of the discharge port of said pump for detecting the presence of fluid flow from said pump; and
   a control unit including a clock unit operatively coupled to said pump for periodically operating said pump for a predetermined time interval, said control unit being operatively coupled to said flow switch for continuing to operate said pump beyond said interval upon said flow switch detecting, at the termination of said interval, fluid flow through said pump, and for subsequently terminating operation of said pump only upon said flow switch detecting a cease of fluid flow through said pump.

2. The system defined in claim 1 wherein said control units further includes a bypass timer connected at a first terminal to said clock and at a second terminal to a normally open contact of said flow switch.

3. The system defined in claim 2 wherein said pump is provided with a discharge line, said discharge port being located at a free end of said discharge line.

4. The system defined in claim 3 wherein said discharge line is a polyethylene tube.

5. The system defined in claim 4 wherein said flow switch is disposed at least in part in said polyethylene tube.

6. The system defined in claim 1 wherein said pump is provided with a discharge line, said discharge port being located at a free end of said discharge line.

7. The system defined in claim 6 wherein said sensor member is disposed at least in part in said discharge line.

8. A system for maintaining a swimming pool cover drained of accumulated precipitation, said system comprising:
   a pump having an intake disposable in a fluid trap defined by an upper surface of the swimming pool cover, said pump having a discharge port disposable outside of said trap for pumping fluid from the trap to a location outside of the pool to drain the fluid from the trap;
   a fluid flow switch having a sensor member disposed in a flow path of the discharge port of said pump for detecting the presence of fluid flow through said pump; and
   a control unit including a clock unit operatively coupled to said pump for periodically operating said pump for a predetermined time interval, said control unit being operatively coupled to said flow switch for continuing to operate said pump beyond said interval upon said flow switch detecting, at the termination of said interval, fluid flow through said pump, and for further continuing to operate said pump until fluid flow through said pump ceases.

9. The system defined in claim 8 wherein said control unit further includes a bypass timer connected at a first terminal to said clock and at a second terminal to a normally open contact of said flow switch.

10. The system defined in claim 8 wherein said pump is provided with a discharge line, said discharge port being located at a free end of said discharge line.

11. The system defined in claim 10 wherein said sensor member is disposed at least in part in said discharge line.

12. A method for maintaining a swimming pool cover drained of accumulated precipitation, said method comprising the steps of:
   disposing an intake of a pump in a fluid trap defined by an upper surface of said swimming pool cover;
   disposing a discharge port of said pump outside of an area covered by said pool cover for pumping fluid from the trap to a location outside of the pool until the fluid is drained from the trap;
   periodically operating said pump for a predetermined time interval;
   monitoring a flow path of the discharge port of said pump with a flow switch having a sensor member disposed in the flow path to detect the presence of fluid flow through said pump; and
   upon detecting, at the termination of said predetermined time interval, fluid flow through said pump, continuing to operate said pump until the flow of fluid along said flow path ceases.

13. The method defined in claim 12 wherein said step of disposing an intake comprises the step of disposing a housing of said pump in said trap.

14. The method defined in claim 13 wherein said step of disposing a discharge port comprises the step of extending a discharge line of said pump from said housing of said pump in said trap to a point outside of said area.

15. The method defined in claim 12 wherein said predetermined time interval is less than fifteen seconds.

16. A method for maintaining a swimming pool cover drained of accumulated precipitation, said method comprising the steps of:
   disposing an intake of a pump in a fluid trap defined by an upper surface of said swimming pool cover;
   disposing a discharge port of said pump outside of an area covered by said pool cover for pumping fluid from the trap to a location outside of the pool until the fluid is drained from the trap;
   periodically operating said pump for a predetermined time interval;
   monitoring a flow path of the discharge port of said pump with a flow switch having a sensor member disposed in the flow path to detect the presence of fluid flow through said pump;

terminating operation of said pump, at the termination of said predetermined time interval, upon said flow switch failing to detect, at the termination of said predetermined time interval, fluid flow through said pump;

continuing to operate said pump, beyond the termination of said predetermined time interval, upon said flow switch detecting, at the termination of said predetermined time interval, fluid flow through said pump; and subsequent to said step of continuing, terminating operation of said pump only upon said flow switch detecting an absence of fluid flow through said pump.

17. The method defined in claim 16 wherein said predetermined time interval is less than fifteen seconds.

18. A system for maintaining a swimming pool cover drained of accumulated precipitation, said system comprising:

a pump having an intake disposable in a fluid trap defined by an upper surface of the swimming pool cover, said pump having a discharge port disposable outside of said trap for pumping fluid from the trap to a location outside of the pool to drain the fluid from the trap;

a fluid flow switch having a sensor member disposed in a flow path of the discharge port of said pump for detecting the presence of fluid flow from said pump regardless of the type of fluid flow through the flow path; and a control unit including a clock unit operatively coupled to said pump for periodically operating said pump for a predetermined time interval, said control unit being operatively coupled to said flow switch for continuing to operate said pump beyond said interval upon said flow switch detecting, at the termination of said interval, fluid flow through said pump, and for subsequently terminating operation of said pump only upon said flow switch detecting a cease of fluid flow through said pump.

* * * * *